UNITED STATES PATENT OFFICE.

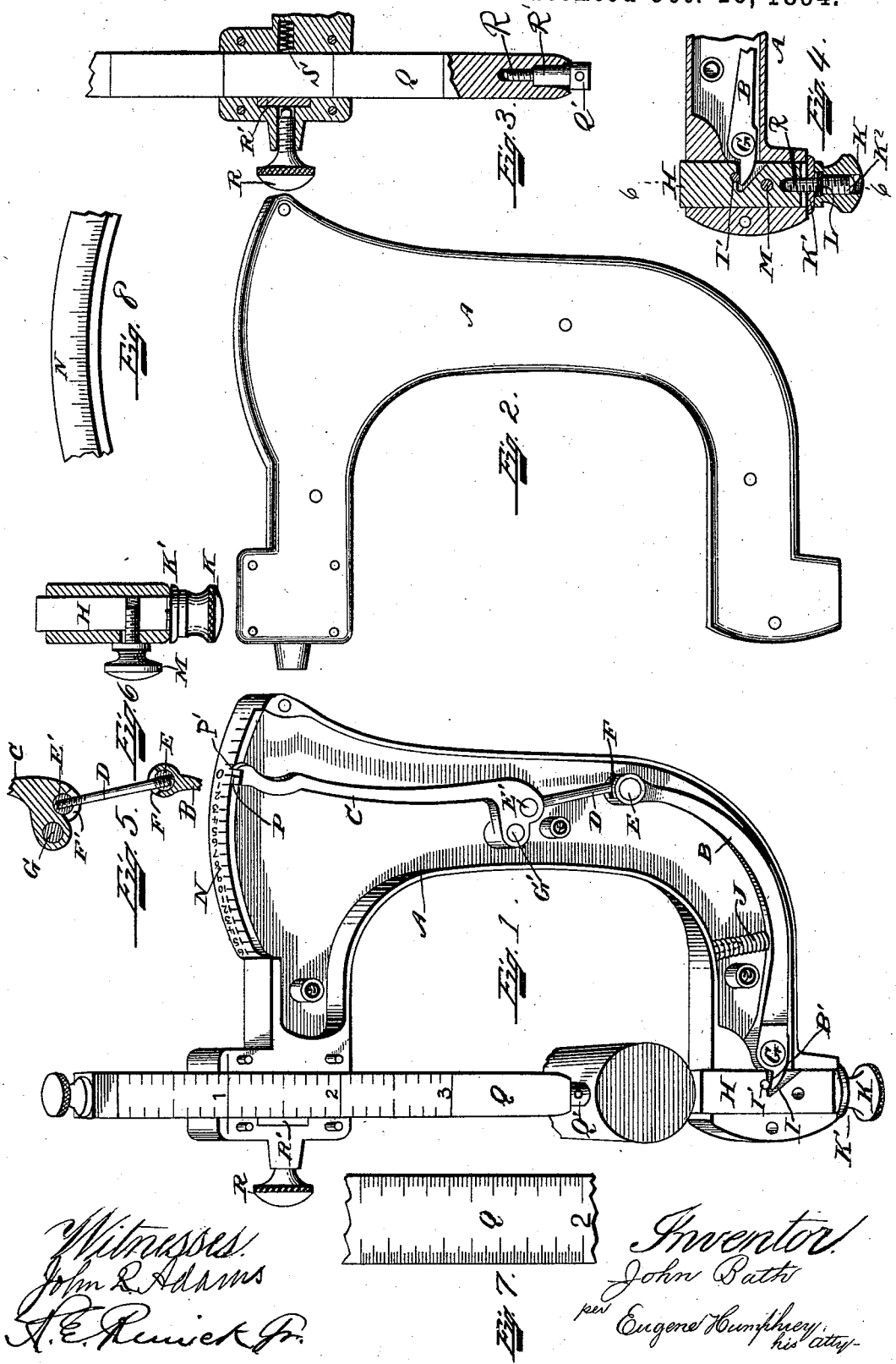

JOHN BATH, OF HYDE PARK, MASSACHUSETTS.

CALIPERS.

SPECIFICATION forming part of Letters Patent No. 527,651, dated October 16, 1894.

Application filed April 4, 1894. Serial No. 506,253. (No model.)

*To all whom it may concern:*

Be it known that I, JOHN BATH, of Hyde Park, in the county of Norfolk and State of Massachusetts, have invented a new and useful Improvement in Calipers, which will, in connection with the accompanying drawings, be hereinafter fully described, and specifically defined in the appended claims.

My present invention is an improvement in construction upon the invention made by me and described in Letters Patent of the United States issued therefor June 13, 1893, and numbered 499,199.

In the accompanying drawings: Figure 1. is a perspective view of my improved caliper with the face-plate removed, and shown as when measuring a round bar exactly one inch in diameter. Fig. 2. is a perspective view of the removed face-plate. Fig. 3. is a detached vertical section showing the manner of holding the scale bar in the head of the caliper, and of inserting the adjustable contact point in the lower end of the bar. Fig. 4. is a vertical section through the lower and opposite point of the caliper. Fig. 5. is a section through the connected ends of the multiplying levers. Fig. 6. is a vertical section taken as on line 6—6, Fig. 4, and as viewed from the left of said line. Fig. 7. is an enlarged portion of the scale bar and more finely graduated than it is shown in Fig. 1. Fig. 8. is an enlarged and more finely graduated portion of the magnified scale on the top of the caliper.

The caliper is composed of a hollow body A, in which are pivoted two levers B and C. Lever B is connected with lever C by a short rod D threaded into round pins E and E' which are nicely fitted to turn in holes drilled through the levers, as shown. Slots F and F' are formed in the levers to allow rod D the necessary play when the levers move on their pivots G and G', as clearly shown in Fig. 5. The upper face, or end, of the slightly yielding block H, fitted to slide in a groove in the lower part of body A, as shown in Figs. 1, 4 and 6, constitutes one of the measuring points of the caliper. In this block is a notch I into which the short arm B' of lever B projects, as shown in Figs. 1 and 4, and has a bearing against the projecting circumference of a hardened bearing pin I' driven tightly into a hole through the block, as shown. The depression of the block causes the pin I' to act upon the arm B' and thus to move lever B against the force of the counteracting spring J which is arranged to bear against the interior wall of the hollow case, and against the lever as shown. Block H is thus upheld by the force of said spring acting on the lever, but its position, or degree of elevation, may be controlled by a nut K on a screw threaded into the lower end of the block through an interposed washer K', the screw having free play through the hole in the washer. This washer bears constantly against the surrounding lower face of the caliper body, and is kept in contact therewith by a spiral spring L which rests in a hollow formed in the nut around its screw, as shown clearly in Fig. 4, and being thus compressed between the nut and washer it serves as a check to prevent the nut from turning on its screw while moving up and down with the block in the practical operation of the caliper.

On the side of the caliper opposite to that shown in Fig. 1, another screw M is employed to lock the block in place when desired. This screw is threaded into the block through a hole or slot in the caliper body large enough to afford the requisite play to the screw and block, as shown in Fig. 6. By turning this screw into the block the wall of the groove is pinched between the head of the screw and the block so that the block is firmly held thereby in any position in which it may be adjusted by screw K, or which it may assume in the operation of measuring a piece of work. The arched scale N on the top of the caliper is shown in Fig. 1 as divided into tenths of an inch and in the enlarged drawing in Fig. 8 it is subdivided into fiftieths of an inch. The tenths on this scale represent one thousandth of an inch movement of block H, and the fiftieths one five thousandth. A line P across the upper end of lever C traverses the edge of the scale N and registers with the lines on said scale; while a lip P' on the lever projects above the scale for convenience in manipulating the lever for a purpose hereinafter stated.

The scale bar Q carries a hardened adjustable measuring point Q' in its lower end, and slides in a groove in the upper part of body A as shown in Figs. 1 and 3. It is held in any desired position in the groove by means of a screw R threaded into the body and bearing against a block R' which bears directly against the scale bar Q, while opposite this block is a spiral spring S which is compressed by the bar into a hole in the wall of the groove, as shown in Fig. 3. The bar is graduated on one edge of its face into tenths of an inch and on the opposite edge into eighths, as shown in Fig. 1, which divisions on the practical scale are subdivided respectively into fiftieths and sixty-fourths, as shown on the enlarged drawing of the scale in Fig. 7. In Fig. 1 is represented a section of a round iron bar, of exactly one inch diameter, between the measuring points of the caliper, and the measure is indicated by the one inch mark on the scale Q, which registers with the marks on the head of the caliper, and by the mark on lever C, which registers with the zero mark on scale N, the point of exact agreement with scale Q. If the piece being measured was one thousandth less than the measure required by scale Q, then the mark P on lever C would stand one tenth of an inch to the right of the zero mark on scale N. If it were one thousandth larger then line P would stand one tenth to the left of the zero mark. When the caliper is not in use and block H is not restrained by screw K from rising to the full height to which lever B under the action of spring J will carry it, then the normal position of mark P on lever C is opposite the fifth mark to the right of the zero mark. Thus it will indicate any minus variation from the true measure required by scale Q to the extent of five thousandths of an inch, and it will also indicate a plus variation from the true measure by moving to the left of the zero mark and to the extent of sixteen thousandths of an inch. The upward extending lip on the index end of lever C enables the workman to conveniently move it with the thumb of the hand in which he holds the caliper and thus to handily separate, through the action of the levers, the caliper points, without resorting to the adjusting nut K, thereby saving time and greatly facilitating the use of the caliper on practical work.

As the practical use and mode of operation of this caliper are substantially the same as that described in my said former patent, it is not deemed necessary to go further into details in describing its use and operation; my present invention having relation to details of construction designed to secure greater durability and accuracy of the instrument.

I claim—

1. A caliper embodying the combination of two multiplying levers B and C pivoted in a body A and connected by a rod D threaded through slots F and F', in said levers, into pins E and E' fitted in holes in the levers; block H fitted to slide in a groove and adapted to serve as one of the measuring points of the caliper, and provided with a notch I having a bearing pin I' arranged therein to rest on the short arm B' of lever B; a spring J operating through lever B to raise block H; and a magnified scale N upon which is indicated, by means of said levers, the position and movement of block H relatively to its counterpoint; all as and for the purposes specified.

2. In a caliper, the combination of a yielding block; two multiplying levers jointed together by means of rod D threaded through slots F F' into pins E E' substantially as described, and actuated by the yielding block; a counteracting spring J; and a micrometer scale N; all as and for the purposes specified.

3. In combination, a yielding block H; multiplying levers B and C actuated by the block; a counteracting spring J; a micrometer scale N; an adjusting nut K on a screw threaded into the block; washer K'; and an interposed check spring between the washer and nut; all as and for the purposes specified.

JOHN BATH.

Witnesses:
JOHN Q. ADAMS,
RALPH W. E. HOPPER.